US012710502B2

(12) United States Patent
Solvang

(10) Patent No.: US 12,710,502 B2
(45) Date of Patent: Aug. 18, 2026

(54) METHOD FOR OBTAINING A POSITION OF A SOUND SOURCE

(71) Applicant: Nomono AS, Trondheim (NO)

(72) Inventor: Audun Solvang, Trondheim (NO)

(73) Assignee: Nomono AS, Trondheim (NO)

( * ) Notice: Subject to any disclaimer, the term of this patent is extended or adjusted under 35 U.S.C. 154(b) by 120 days.

(21) Appl. No.: 18/722,483

(22) PCT Filed: Dec. 21, 2022

(86) PCT No.: PCT/EP2022/087370

§ 371 (c)(1),
(2) Date: Jun. 20, 2024

(87) PCT Pub. No.: WO2023/118382

PCT Pub. Date: Jun. 29, 2023

(65) Prior Publication Data

US 2025/0067832 A1 Feb. 27, 2025

(30) Foreign Application Priority Data

Dec. 22, 2021 (DK) ............................ PA202170662

(51) Int. Cl.
*G01S 3/808* (2006.01)
*H04R 1/40* (2006.01)
*H04R 3/00* (2006.01)

(52) U.S. Cl.
CPC ............ *G01S 3/8083* (2013.01); *H04R 1/406* (2013.01); *H04R 3/005* (2013.01); *H04R 2201/405* (2013.01); *H04R 2430/03* (2013.01)

(58) Field of Classification Search
CPC ......... G01S 3/8083; G01S 5/18; H04R 1/406; H04R 3/005; H04R 2201/405; H04R 2430/03; H04S 2400/15
See application file for complete search history.

(56) References Cited

U.S. PATENT DOCUMENTS 10,670,694 B1 6/2020 Youssef et al.
11,606,659 B2 * 3/2023 Chebiyyam ............ H04R 3/005
(Continued)

FOREIGN PATENT DOCUMENTS

AU 2022420802 A1 * 8/2024 ............ H04R 3/005
AU 2023281878 A1 * 1/2025 ............ H04S 3/008
(Continued)

OTHER PUBLICATIONS

Translation of DE 102014114529 (Year: 2024).*
(Continued)

*Primary Examiner* — Daniel Pihulic
(74) *Attorney, Agent, or Firm* — SHOOK, HARDY & BACON L.L.P.

(57) ABSTRACT

The invention relates to a method for obtaining a position of a sound source relative to a dedicated reference point. A first and a plurality of second sound signals are recorded which are synchronized in time. The position can be obtained by applying an estimated filter to a correlated signal derived by correlation of the first sound signal with at least one of the plurality of second sound signals in the frequency domain. Two timing values are derived in the at least one filtered and correlated signal exceeding a dedicated threshold in the time domain. Then the distance between the dedicated reference point and the sound source based on the respective obtained first timing value and second timing value.

20 Claims, 4 Drawing Sheets

(56) References Cited

U.S. PATENT DOCUMENTS

| | | | | |
|---|---|---|---|---|
| 2011/0232989 | A1 | 9/2011 | Lee et al. | |
| 2019/0377056 | A1* | 12/2019 | Dudyala | G01S 3/808 |
| 2020/0066295 | A1* | 2/2020 | Karimian-Azari | G10L 21/0264 |
| 2022/0312138 | A1* | 9/2022 | Chebiyyam | G01S 3/8083 |
| 2025/0067832 | A1* | 2/2025 | Solvang | G01S 3/8083 |
| 2025/0330770 | A1* | 10/2025 | Solvang | H04R 5/027 |

FOREIGN PATENT DOCUMENTS

| | | | | | |
|---|---|---|---|---|---|
| CA | 3241144 | A1 | * | 6/2023 | H04R 3/005 |
| CN | 113126028 | A | | 7/2021 | |
| CN | 118633032 | A | * | 9/2024 | H04R 3/005 |
| CN | 119563117 | A | * | 3/2025 | H04S 3/008 |
| DE | 102014114529 | B4 | * | 2/2024 | G01S 3/805 |
| GB | 2555278 | A | | 4/2018 | |
| JP | 2025500328 | A | * | 1/2025 | H04R 3/005 |
| JP | 2025517542 | A | * | 6/2025 | H04S 3/008 |
| KR | 10-1254984 | B1 | | 4/2013 | |
| KR | 20240130733 | A | * | 8/2024 | H04R 3/005 |
| KR | 20250037419 | A | * | 3/2025 | H04S 3/008 |
| WO | WO-2023232864 | A1 | * | 12/2003 | H04S 3/008 |
| WO | WO-2022212011 | A1 | * | 10/2022 | G01S 3/8083 |
| WO | WO-2023118382 | A1 | * | 6/2023 | H04R 3/005 |
| WO | WO-2025186171 | A1 | * | 9/2025 | G10L 21/0272 |

OTHER PUBLICATIONS

Grumiaux et al., "A Review of Sound Source Localization with Deep Learning Methods", Available online at: <https://arxiv.org/abs/2109.03465>, Sep. 2021, 26 pages.

* cited by examiner

METHOD FOR OBTAINING A POSITION OF A SOUND SOURCE

CROSS-REFERENCE TO RELATED APPLICATIONS

This application claims priority under 35 U.S.C. § 365 to PCT/EP2022/087370 filed on Dec. 21, 2022, entitled "METHOD FOR OBTAINING A POSITION OF A SOUND SOURCE," and Denmark Patent Application No. PA202170662, filed Dec. 22, 2021, entitled "METHOD FOR OBTAINING A POSITION OF A SOUND SOURCE." The entirety of the aforementioned applications are incorporated herein by reference.

The present invention relates to a method for obtaining a position of a sound source relative to a dedicated reference point. The invention also relates to a computer system and toe a non-transitory computer-readable storage medium.

BACKGROUND

Sound field or spatial audio systems and formats like ambisonics or Dolby Atmos provide encoded sound information associated with a given sound scene. By such approach one may assign position information to sound sources within a sound scene. These techniques are already known in certain computer games in which a recorded sound is attributed with game object position information, but also in live capturing of events, e.g. capturing a large orchestra or sports event. Consequently, the number of possible applications is huge and ranges from immersive effect indicated above e.g. by having the impression of taking part in the sports event to virtual or augmented reality experiences.

In many cases recording of sound for such application is a challenge in itself using spatial audio microphones. While those are useful for capturing live sound field information from a particular point in space, they also have some technical limitations since they are based on beamforming techniques and are generally considered expensive. For example, the sound quality of a person located at a large distance from the microphone may be reduced. In more noisy or reveberberant situations, or if more than a single person is talking, identification and isolation of individual sound sources for the purpose of equalizing or other processing techniques are difficult.

In the meantime, audio content creator also realized the need for high quality audio including the usage of spatial audio information, either for improving quality of sound recording or for adding additional sound effects increasing the immersion for the listener. Consequently, there is a need for a lesser costly solution, which achieves the benefits and advantages of the high level spatial audio microphones. The solution should work irrespectively of the hardware, allowing a flexible use in different scenarios.

SUMMARY OF THE INVENTIONS

The present disclosure with its proposed principles provides a method to achieve several benefits and advantages mentioned above. The inventor has found a method that offers a precise determination of a position, both in distance and angle of a sound source relative to a dedicated reference point. The method proposed is largely independent of the hardware used and is scalable to different levels of quality. Furthermore, the method allows for off-line processing and real-time processing. As a result, the proposed method can be included in a variety of applications including, but not limited to sound capturing and processing for podcasts, film, live or other events, audio and teleconferencing, virtual reality, video games application and the like.

In an aspect, the inventors propose a method for determining a position of a sound source relative to a dedicated reference point. In this regard, the expression "position" does include the distance from the sound source to the dedicated reference point, an angle based on one or two axes through the reference point or a combination thereof. The method obtains a first sound signal recorded at a sound source. Likewise, a plurality of second sound signals is recorded at a position in a known relation to the dedicated reference point. The first sound signal and the plurality of second sound signals are synchronized in time.

Usually it is assumed that the first sound signal is recorded at the proximity of the sound source, meaning that the distance is relatively low compared to the distance between the sound source and the dedicated reference point. However, the term "at the sound source" is not to be understood in a very limited sense. Rather, the expression shall include and allow for a certain distance between the actual sound source and a microphone. Similarly, the plurality of second sound signals is recorded at different locations, for which the distance and angle to the reference point is known. Time synchronization is important for the proposed method in subsequent steps. Such time synchronization can be achieved in some instances by providing a common time base for any sound signal recorded. In some other instances, the recorded sound signals can be used to provide the time base, e.g. by timely correlating a dedicated start signal that is recorded and included in the first and the plurality of second sound signals.

A filter is now estimated for the first sound signal acting on the signal-to-noise ratio in each frequency bin of the first sound signal in a time-frequency domain. Then, the first sound signal is correlated with at least one of the plurality of second sound signals in the frequency domain to obtain at least one correlated signal. In some instances, the first sound signal is correlated with each of the plurality of second sound signals to obtain a plurality of correlated signals.

The previously estimated filter is applied to the at least one correlated signal to obtain at least one filtered and correlated signal.

In the next step, one can estimate the distance between the dedicated reference point and the sound source. For this purpose, a first timing value in the at least one filtered and correlated signal exceeding a dedicated threshold in the time domain is obtained. A second timing value corresponding to a threshold value in the at least one filtered and correlated signals based on the first timing value is also obtained.

The distance between the dedicated reference point and the sound source is now derived based on the respective obtained first timing value and second timing value. If more than a single filtered and correlated signals are derived in the previous step, a plurality of distances is obtainable enabling to improve the distance determination, (e.g. by calculating a mean value including error margins and the like).

Alternatively or also additionally, an angle of a sound source relative to an axis through the dedicated reference point can be calculated. For this purpose at least two filtered and correlated signals and an optional a priori estimate or knowledge of microphone locations providing the plurality of second sound signals are utilized. In a subsequent step after applying the above-mentioned filter and correlating the filtered first signal with at least two of the plurality of second sound signals in the frequency domain to obtain at least two correlated sound signals, the at least two filtered and correlated sound signals are truncated around a specific time period. Then, a cross correlation between pairs of truncated filtered and correlated sound signals are obtained. The angle of arrival of the filtered first sound signal is derived by projecting the obtained cross correlation in a spherical spatial space based on the a priori estimate or knowledge of microphone locations providing the plurality of second sound signals.

With the proposed method it is possible to obtain distance and angle independently from each other. Correlating the two different signals can be done off-line on recorded and stored sound signals as well as in real-time if necessary, enabling the method to be used in a variety of applications. Further it is possible to exchange first and second sound signals as well as deriving slowly moving sound sources. By correlating different first sound signals, one may further improve the accuracy of the proposed method. The method is robust against reflections of sound, which is useful during recording sessions in closed space.

The speed of sound traveling though matter is dependent of the matter temperature. For a precise measurement, the air temperature is measured, particularly in the vicinity of the plurality of second sound sources. Such measurement can be repeated periodically to compensate for temperature changed during the recordal session. The distance is estimated in response to the derived air temperature.

In some instances, the above-mentioned specific time period is proportional to a maximum time of flight between two different positions of the plurality of second sound signals. The window defined by the specific time period ensures that sound reflections caused by room walls or other large objects are omitted during the cross correlation step. This also means that the distance between two different positions of the plurality of second sound signals can be adjusted depending on the environment of the recording session, thereby further increasing the flexibility of the proposed method.

In some instances, the step of truncating the filtered and correlated sound signal comprises the step of up-sampling. Up-sampling can be performed on the plurality of filtered and correlated sound signals; or on the truncated filtered and correlated sound signals. This step provides a finer time resolution and thus a higher resolution for both the distance and angle determination. In the regard of angle determination, one can obtain a cross correlation by applying a steered response to each of the truncated filtered and correlated sound signals.

The location of the maximum of the cross correlation (or PHAT for SRP-PHAT) of a pair of second sound signals (associated with certain positions) corresponds to the time difference of arrival between those positions. The time difference of arrival can be mapped to angle of incidence making use of the knowledge about the position at which the second sound signals were recorded. Hence, the cross correlation can be projected in the spherical spatial space instead of the time domain. This is carried out for all filtered and truncated cross correlation estimates for an appropriate set of pairs of second positions (or their respective associated second sound signals) for determining an angle of arrival suitable for the application. For instance, in the case that the sound sources are only in the horizontal plane, it sufficient to use the set of positions than spans this plane, but not other sets, thus reducing the computational complexity. The projected estimates are then simply summed together and a search for the maximum is carried out. The location of the maximum corresponds to the angle of arrival.

In some other instances, the step of estimating a filter for the first sound signal comprises estimating a spectrum mask. For such a spectrum mask filter, the signal to noise ratio, SNR can be determined based on the noise for each time slice in response on a previous time slice. The spectrum mask parameter is set to 0, if the signal to noise ratio does not exceed a pre-determined threshold for a given frequency. Likewise, the spectrum mask parameter is set to 1 for a given frequency, if the signal to noise ratio does the pre-determined threshold. In some other instances estimating a filter acting on the signal-to-noise ratio in each frequency bin of the first sound signal comprises the steps of applying a quantile filter, particularly a median filter for smoothing a power spectrum for each time slice of a power spectrum derived from the one or more first recorded sound signals. Then, the noise for each time slice is estimated in response on a previous time slice. As in the previous approach, it is evaluated whether the signal to noise ratio for a given frequency exceeds a pre-determined threshold. Consequently, the filter parameter for said frequency is either set to 1 or 0 in response thereto. In some other instances estimating a filter acting on the signal-to-noise ratio in each frequency bin of the first sound signal comprises the steps of applying the residual signal from a denoising process as the noise estimate. The denoising process can be based on machine learning. As in the previous approaches, it is evaluated whether the signal to noise ratio for a given frequency exceeds a pre-determined threshold. Consequently, the filter parameter for said frequency is either set to 1 or 0 in response thereto.

Some further instances concern the step of correlating the first sound signals with at least one of the plurality of second sound signals. A short-time Fourier transformation, STFT is applied to the first sound signal and to the at least one of the plurality of second sound signals to obtain respective spectrograms. Then, a cross spectrum on the respective spectrograms is obtained and the filter previously obtained applied to the cross spectrum. The correlated and now filtered spectrogram is transformed back into the time domain by performing an inversed short-time Fourier transformation, ISTFT. This will provide the filtered and correlated first sound signal.

Some other instances concern a delay of the sound recorded at two different positions. Both positions are associated with a first sound signal, which is recorded at the respective position. The proposed method offers a simple tool to calculate the distance between the positions associated with two or more first sound signals. This is useful not only to estimate possible crosstalk between two or more microphones (recording the first sound signals), but also provides information about relative distance between microphones that can be used for post processing making the position estimate. As a result, the approach can be used to obtain information of a sound source, which is distanced from the positions, at which the two (or more) first sound signals are recorded.

In some instance, a filter is estimated acting on the signal-to-noise ratio in each frequency bin of one of the two first sound signals in a time-frequency domain. This process is done for both first sound signals, such that two different filters are estimated. Then, the first of the two first sound signals is correlated with the second one of the two first sound signals in the frequency domain and the estimated filter associated with the first one of the two sound signals is applied. The process may be repeated with the second of the two first sound signals and its respective filter. A time difference between the correlated signal is evaluated. This time difference provides the information about the possible crosstalk in one of the first sound signals. Consequently, one of the two first sound signals based on the evaluation of the time difference can be selected as the one or more first sound signal and used for further processing.

The above-mentioned step of correlating can include in some instances a short-time Fourier transformation, STFT performed on the respective two first sound signals to obtain a spectrogram. The cross spectrum derived from the respective spectrograms and said filter applied to the obtained cross spectrum. To finally obtain the filtered and correlated first sound signal, an inversed short-time Fourier transformation, ISTFT, is performed to obtain the filtered first sound signal.

It is useful to position the microphones recording the second sound signals at dedicated locations. For example, the plurality of second sound signals may comprise four audio sound signals, wherein two of those four sound signals are recorded with a maximum spatial distance of 15 cm. This distance is usually small enough to avoid accidental recordals of direct sound and reflected sound of the same source at the same time, while being large enough to provide enough difference when cross-correlating the second sound signals with the first sound signal without employing excessive up-sampling.

Some further aspects concern the identification and processing of moving sound sources. Such sources may be difficult to identify because a moving sound source will influence the STFT by doppler shift. Furthermore, estimation noise can be identified as a moving sound source or as two or more sound sources located at different positions. For this reason, the estimated distance between the dedicated reference point and the one or more sound sources might be fed to a Kalman filter (or particle filter if the estimation noise is non Gaussian, which will be the case for outliers).

In some further instances, a computer system is provided, comprising one or more processors and a memory. The memory is coupled to the one or more processors and comprises instructions, which when executed by the one or more processors cause the one or more processors to perform the above proposed method and its various steps. Likewise, a non-transitory computer-readable storage medium can be provided comprising computer-executable instructions for performing the Method according to any of the preceding claims.

SHORT DESCRIPTION OF THE DRAWINGS

Further aspects and embodiments in accordance with the proposed principle will become apparent in relation to the various embodiments and examples described in detail in connection with the accompanying drawings in which FIG. 1 illustrate an embodiment of the proposed method showing several process steps for determining the position of a sound source;

DETAILED DESCRIPTION

The following embodiments and examples disclose different aspects and their combinations according to the proposed principle. The embodiments and examples are not always to scale. Likewise, different elements can be displayed enlarged or reduced in size to emphasize individual aspects. It goes without saying that the individual aspects of the embodiments and examples shown in the figures can be combined with each other without further ado, without this contradicting the principle according to the invention. Some aspects show a regular structure or form. It should be noted that in practice slight differences and deviations from the ideal form may occur without, however, contradicting the inventive idea.

In addition, the individual figures and aspects are not necessarily shown in the correct size, nor do the proportions between individual elements have to be essentially correct. Some aspects are highlighted by showing them enlarged. However, terms such as “above”, “above” “below”, “below” “larger”, “smaller” and the like are correctly represented with regard to the elements in the figures. So it is possible to deduce such relations between the elements based on the figures.

Figure 3:
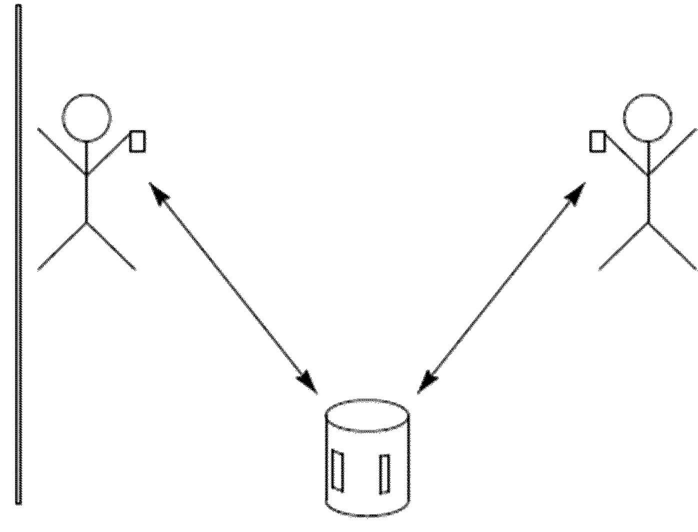
FIG. 3 is an illustrative view of a recording environment with several microphones to record a more complex sound field scenario.

FIG. 3 illustrates an application using the method in accordance with the proposed principle. The scenario corresponds to a typical sound recordals session, in which a plurality of sound signals is recorded to obtain the sound field of a scenery. While the present example uses speech recordals of a natural person, one may realize that the present method and the principles disclosed herein are not limited to speech processing or finding the positions of natural persons. Rather it can be used to localize any dedicated sound source relative to a reference point.

The present scenery contains two sound sources depicted as P1 and P2, which in this embodiment are two respective persons having a conversation in an at least partially enclosed space. Each person holds a microphone M1 and M2, respectively at close proximity of their respective bodies. Hence, one can associated the microphones M1 and M2 to be at the positions of the respective sound sources. A plurality of second microphones M3 and M4 is located at position B1. Position B1 is also defined as the reference point. Persons P1 and P2, respectively located at a certain distance and angle towards reference point B1, and also spaced apart from each other. A wall W is located at one side generating reflections during the speech of each sound sources P1 and P2.

Microphones M1, M2, M3 and M4 are time synchronized with each other, i.e. recording the sound in this scenario is done using a common time base. When recording the conversation, microphone M1 records the speech of person P1 and with some delay also the speech of person P2. Likewise due to the speed of sound and the distance of person P1 from reference point B1, microphones M3 and M4 record the speech of persons P1 and P2 with some delays. Depending on the distance, the delay is different, but in any case, the direct way from the sound source to one of the microphones M3 and M4 is referred to as direct sound.

Assuming now, there is only single sound source P1, one can simply calculate the distance using the direct sound; that is to the reference point B1 using the direct sound; that is by measuring the time delay between the sound signal recorded by microphone M1 and one of microphones M3 or M4 multiplied by the speed of sound.

As the speed of sound is dependent of the temperature, a temperature sensor T1 is located in the proximity of microphones M3 and M4 to measure the air temperature, correcting the effect of temperature changes. The above-mentioned scenario is quite simple and not suitable for real world scenarios. For once, wall W will reflect portions of the speech, which then will be recorded by microphone M1 but also by microphones M3 and M4 after some delay. Microphone M4 will also record the speech. Depending on the scenario, the reflected sound speech superimposes with the ongoing speech. Due to possible constructive interference or other effects it may occur that the recordal of the indirect reflected sound comprises a higher level than the direct sound. In an even more complex scenario, the second sound source also provides a sound signal at the same time resulting in a superposition of several different sound signals, some of them originating from sound sources P1 and P2, some of them being reflections on the wall.

The present application aims to process the recorded signals in such way that it is possible to identify and locate the position of the respective sound sources relative to the reference point.

Another application addressing the issue of associating certain position information with a sound source is present in virtual reality (VR) applications. Such application usually includes a 360° stereoscopic video signal with several objects within the virtual environment, some of which associated with a sound corresponding object.

These objects (both visual and audio) are presented to a user via for example a binocular headphones and stereo headphones, respectively. Binocular headphones are capable of tracking the position and orientation of the user's head (using, for example, IMU/accelerometers) so that the video and audio played to the headphones and earphones, respectively, can be adjusted accordingly to maintain the illusion of virtual reality. For example, at a given moment, only a portion of a 360° video signal is displayed to the user, which corresponds to the user's current field of view in the virtual environment. As the user moves or rotates their head, the portion of the 360° signal displayed to the user changes to reflect how the movement will change the user's view in the virtual world. Similarly, as the user moves, sounds emanating from different locations in the virtual scene may be subjected to adaptive filtering of the left and right headphone channels to simulate frequency-dependent phase and amplitude changes in the sounds that occur in real life due to spatial offset between the ears and the human head and upper body scattering.

Some VR productions consist entirely of computer-generated images and separately pre-recorded or synthesized sounds. However, it is becoming increasingly popular to produce "live action" VR recordings using a camera capable of recording a 360° field of view and several microphones capturing the sound field. The recorded sound from the microphone is then processed with the method according to the proposed principle and aligned with the video signal to produce a VR recording that can be played via headphones and earphones as described above.

Another application addressing the issue of associating certain position information with a sound source is present in next generation audio (NGA) applications. Such application usually includes audio objects with metadata such as position.

These objects (both visual and audio) are presented to a user via for example headtracked stereo headphones with binaural rendering. Such headphones are, as binocular headsets, capable of tracking the orientation of the user's head (using, for example, IMU/accelerometers) so that the audio played to the headphones, can be adjusted accordingly to maintain the illusion of being immersed by the audio. For example, as the user moves or rotates their head, sounds emanating from different locations in the virtual scene, or recorded scene using this innovation, may be subjected to adaptive filtering of the left and right headphone channels to simulate frequency-dependent phase and amplitude changes in the sounds that occur in real life due to spatial offset between the ears and the human head and upper body scattering.

Figure 1:
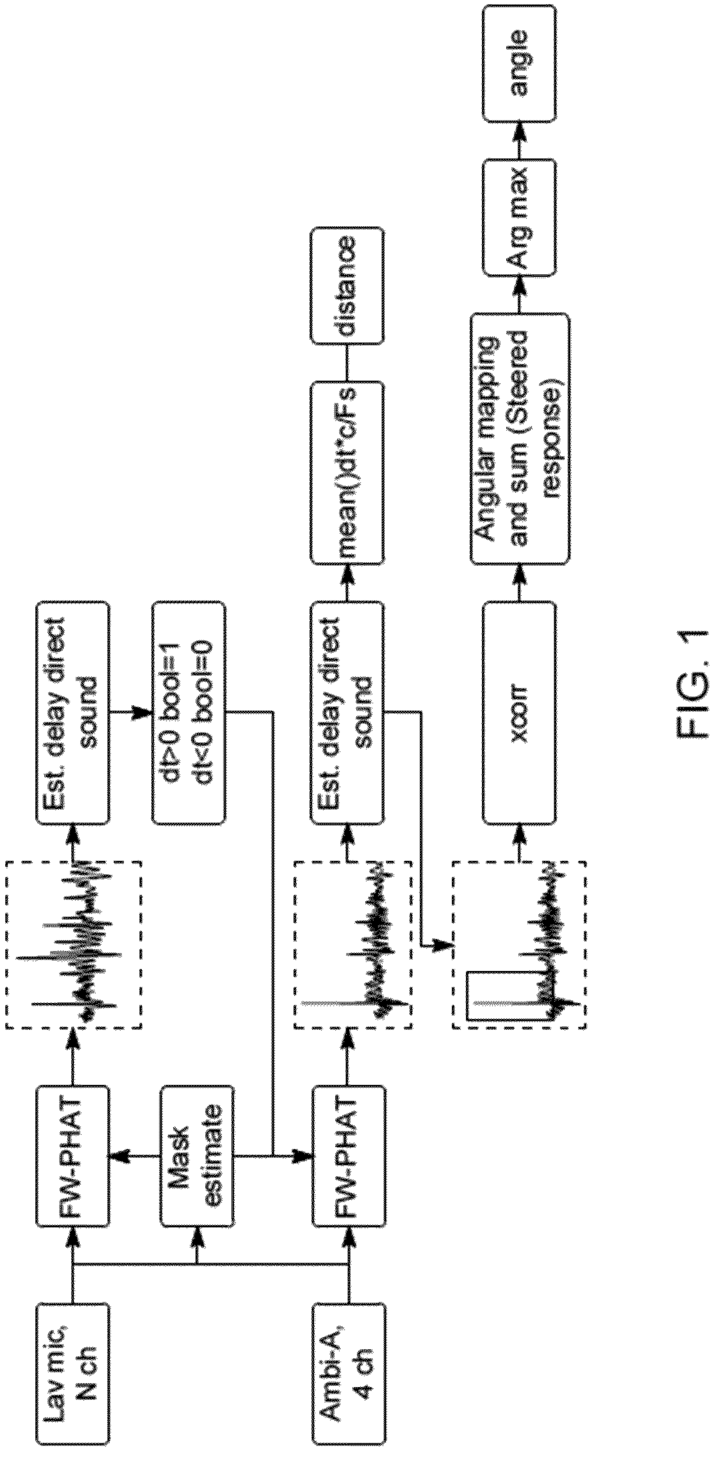

Referring now to FIG. 1 illustrating various blocks of the method in accordance with the proposed principle. For the purpose of simplicity, the method is explained using the above-described scenario of FIG. 3. The method is suitable for postprocessing of pre-recorded sound signals but also for real-time sound signals e.g. during an audioconference, a live event, and the like. The method starts with providing one or more first sound signals and a plurality of second sound signals in blocks BM1 and BM2, respectively. The recorded sound signals preferably comprise the same digital resolution including the same sample frequency (e.g. 14 bit at 96 kHz. In case different resolutions or sampling frequencies are used, it is advisable to re-sample the various sound signals to obtain signals with the same resolution and sampling frequency.

The upper portion of the picture including elements 3', R1, 30A and 31 concerns the identification of possible crosstalk between two or more first sound signals, that is sound signals, which are recorded by microphones, for which the position is to be determined. As mentioned previously, reflections, but also direct sound are recorded by the two microphones in block BM1. To determine, which of the two or more microphone is actually positioned at the respective sound source, the signals recorded by the two microphones are to be processed filtered and cross correlated to obtain a time difference in the cross correlation.

For this purpose, both signals are processed using a frequency weighted phase transformation. In a first step, each of the first signals are transformed into the frequency domain to using an STFT to obtain a time-frequency spectrum. A spectrum mask filter is derived from the spectrum by first generating a smooth power spectrum S(l, k), with l being the sound signal from the microphone and k the respective frame of the sound signal. For each frequency bin a first order filter estimates the noise n(l, k) in the current frame based on previous frame. The overall noise n(l, k) is given by $$n(l, k) = (1-\alpha)\log(S(l, k)) + (n(l, k-1))^{\alpha}$$

with different $\alpha$ depending on $S(l, k)<\log(n(l, k-1))$. Hence, the filter mask is 1 when the SNR is above a certain threshold and otherwise 0. The results are different filter masks, associated with each of the two first signals. In a next step, the cross spectrum is generated by cross correlating two pairs of the first signals and normalizing the result of the cross correlation. Then, the respective estimated filter is applied to the normalized cross spectrum and an inverse STFT is performed to obtain a filtered and correlated signal, see reference 31. In this regard, one should note that for the cross spectrum made $R_{xy}$ one should use the filter Fx (for the signal x) and for the cross spectrum $R_{yx}$ the filter Fy (for signal y). The filtered and correlated signals are then used to estimate the signed time difference or delay of the direct sound in both microphones recording the first sound signals. The sign, i.e. dt>0 or dt<0 depicted in block 31 provides information, which microphone is closer to the actual sound source. Consequently, this microphone (and sound signal) is then associated with the respective sound source and the corresponding filter mask.

The above-mentioned steps can be omitted if the association of sound signals to the respective sound source is defined, i.e. if only one first signal is recorded. Referring back to FIG. 3, the blocks 3, R2 to 35 illustrated in the lower part describe the various steps of estimating the distance to the reference points and the angle. Block BM3 contains a plurality of second sound signals recorded by ono or more second microphones whose location is fixed in regard to the reference point. The location of each of the second microphones is slightly different to be able to obtain the angle later on, but close enough that effects like reflections from the wall and the like can be determined and filtered. In the present example four different second sound signals are present each recorded by a different second microphone.

The process now is similar as described with the processing of the two or more first sound signals. However, in block 3, the first sound signals (the one for which distance and angle shall be determined) is now cross correlated with at least one of the four second sound signals. Block 3 can be performed with each of the second sound signals to provide overall four filtered and cross correlated signals, see reference R2 for an example.

Figure 2:
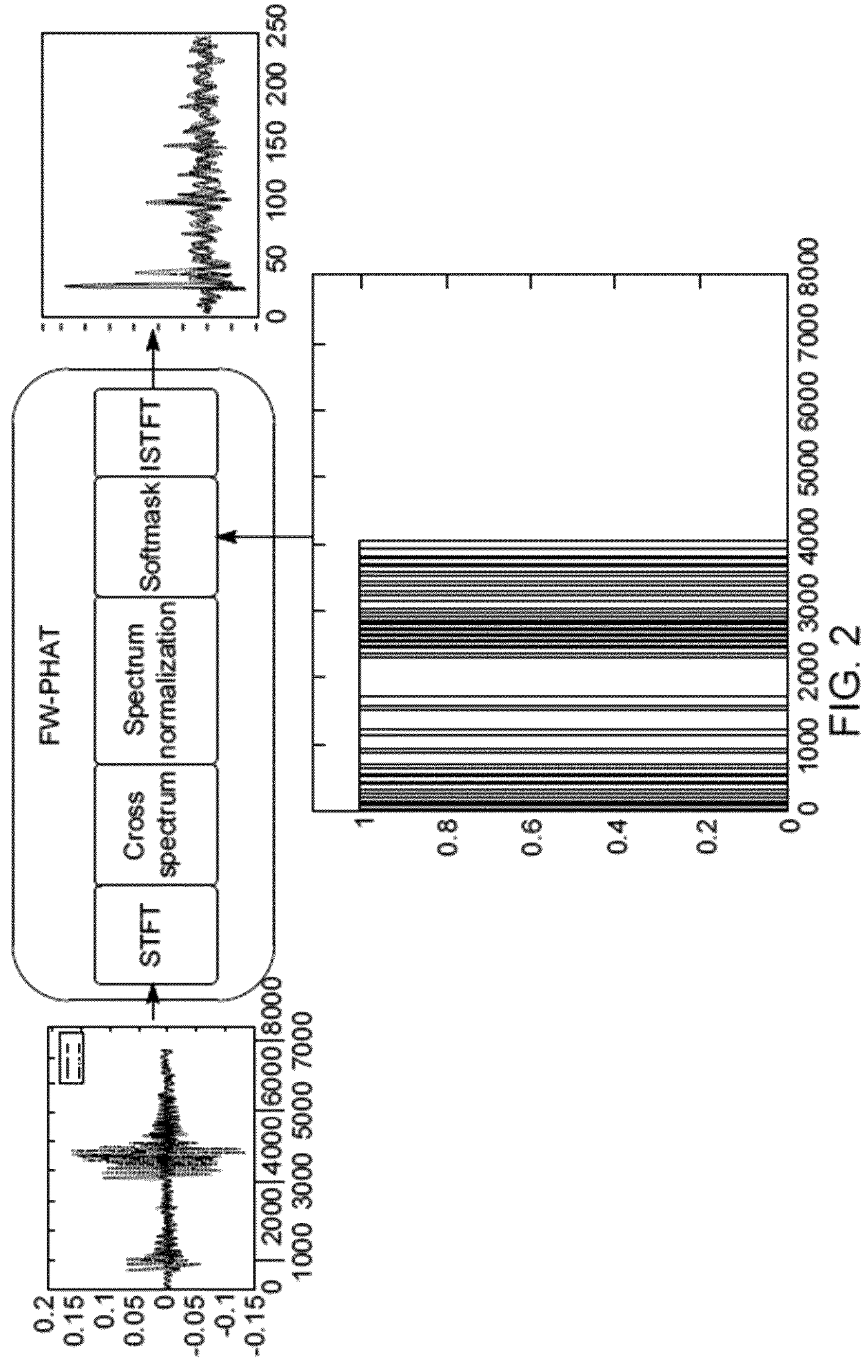
FIG. 2 shows the step of a frequency weighted phase transform applying a spectrum mask to obtain a filtered and correlated signal.

FIG. 2 shows the frequency weighted phase transformation in an exemplary embodiment. The two input signals are transformed into the frequency domain using an SFTF and then the cross spectrum is derived from it. After normalizing the spectrum, the previously estimated filter, in this case a spectrum mask filter associated with the first sound signal is applied. The result is then transformed back into the time domain using an inverse SFTF.

The time delay in blocks 30B and 30A are estimated by first identifying the maximum value a peak would have if the signals in the frequency weighted PHAT would be uncorrelated. For this purpose, the noise variance is given by sigma=mean (mask)/framesize and the maximum value of the noise derived by sqrt (sigma*2*In (framesize). Then, a search is performed for the first value in the frequency weighted PHAT that exceeds this maximum (possible including a scale for some headroom) and the search refined for a local maximum close to that first value. The location of the maximum corresponds to the time of flight for the direct sound (n max/sampling frequency). The distance is then given by the time of flight multiplied by the speed of sound under consideration of the temperature dependency of the speed of sound.

The process in block 30B is repeated for each of the cross-spectrum. The various results are further processed in block 31 by using the mean of the set of time of flights estimates. The distance is then deducted in block 33 from this estimate.

To obtain the angle between the sound source and the reference points, blocks R3, 30C and 34 to 36 are used. To avoid any influence of room reflections a window function is used to truncate the FW-PHAT results of the first filtered and correlated signal in block R2. The window function, as shown in FIG. R2 comprises a width, which is dependent on the distance between the second microphones. As the second microphones recording the second sound signals are spaced apart slightly, the estimated distances between the sound source and the respective second microphone may also vary. The width of the window function for truncating the first filtered and correlated signals is substantially proportional to the maximum of the time of flight between the second microphones. The now truncated set of filtered and correlated signals are up-sampled to provide a finer time resolution, resulting in a more precise estimate for the angle. The cross correlation between pairs of up-sampled truncated first signals is subsequently calculated. Consequently, one will receive a total of 6 results (4 truncated filtered signals results in 6 different pairs).

The location of the maximum of the cross correlation of a pair of the up-sampled truncated first signals corresponds to the time difference of arrival of the first signal to the respective second microphones. The time difference of arrival is mapped to the angle of incidence making use of the knowledge about the location of the second microphones to the reference point. This means that the cross correlation can be projected in the spherical spatial space instead of the time domain. The approach depicted in Block 34 is similar to the steered response step in an SRP-PHAT approach, with the 6 pairs of cross-correlations corresponding to the PHAT. The projected estimates are then simply summed together and a search for the maximum is conducted in block 35. The location of the maximum corresponds to the angle of arrival.

Figure 4:
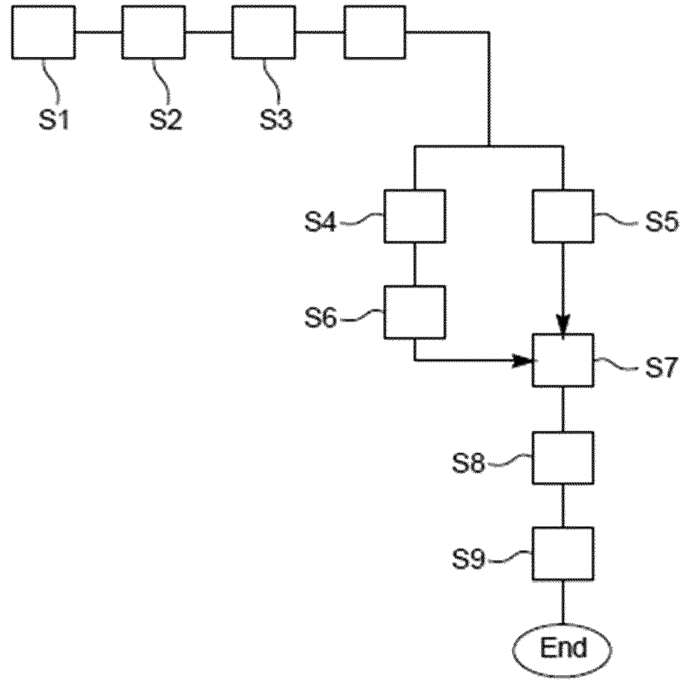
FIG. 4 illustrates a process flow of a method in accordance with some aspects of the proposed principle.
Figure 5:
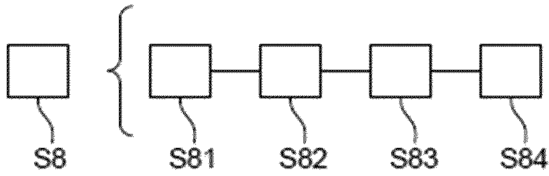
Figure 6:
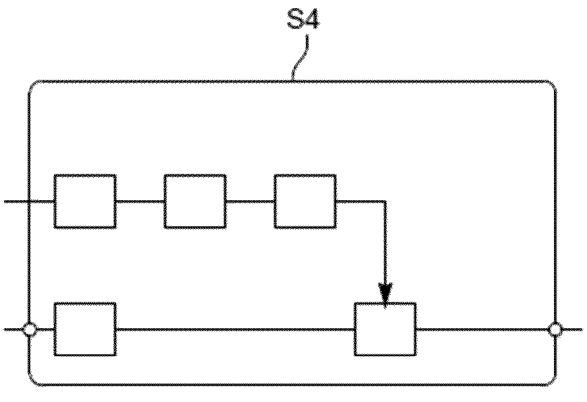

FIG. 4 illustrates the process flow of a method for determining distance and angle in accordance with the proposed principle. The method is suitable for real time processing as well as for off-line processing, in which several previously recorded sound signals forming a sound field are processed.

The method includes in step S1 obtaining a first sound signal recorded at a sound source, for which the distance and angle to a reference point has to be determined. A plurality of second sound signals is recorded either in close proximity of the reference point or at least in a known location or position to the reference point. First sound signals and the plurality of second sound signals are synchronized in time. Such time synchronisation can be achieved by referencing all sound signals against a common time base during the recordal session.

The various signals are then optionally pre-processed in step S3. For example, denoising or equalizing can be performed on the recorded sound signals to improve the results in the subsequent steps of processing. However, care should be taken not to disturb the timing of the signals. It may also be useful in some instances to apply method during the pre-processing step S3, which preserve phase information of the recorded signal. Further, an STFT is performed on the first sound signal and each of the second sound signals.

In the present example, only a single first sound signal associated with a single sound source is present. The first sound signal is processed by estimating a filter in step S4, in particular a spectrum mask filter. The filter acts on the signal to noise ratio in each frequency of the first sound signal in the time domain. The resulting spectrum mask contains a set of "1" and "0" for each frequency bin.

In step S5, the first sound signal is correlated with at least one of the plurality of second sound signals in the frequency domain and at least one correlated signal is obtained. This step S5 can be repeated to cross correlate the first sound signal with each of the second sound signals. The cross correlation can be normalized prior to applying the filter estimated in step S4 to obtain on or more filtered and correlated signals.

Until this point the steps for determining the distance or the angle are similar.

Continuing now with the determination of the distance between the reference point to the sound source and steps S6 to S8. Step S6 includes obtaining a first timing value in the at least one filtered and correlated signal exceeding a dedicated threshold in the time domain. Then, a second timing value corresponding to a threshold value in the at least one filtered and correlated signals based on the first timing value is obtained in step S7. Both steps S6 and S7 may use the previously described search for a maximum value in the PHAT signals (i.e. the filtered and correlated signal). The distance between the dedicated reference point and the sound source is based on the respective obtained first timing value and second timing value in step S8. Still, one may also take the temperature of air into account. In case of pre-recorded signals, this information is stored and used in S9 to compensate for temperature effects affecting the speed of sound.

Steps S10 to S13 are executed to derive and estimate the angle of the sound source from the reference point. Fort this purpose, step S5 has to be executed several times to obtain a cross-correlation of the first sound signal with each of the second sound signals. In step S10, the cross-correlated PHAT signals are truncated by applying a window function on the PHAT signals. The window function is centered at the peak corresponding to the time of flight with a width that is proportional to the maximum time of flight between the second sound sources. Applying a truncated window in step S10 will remove signals portions caused by reflection of the sound on an object and other indirect sound paths.

Then, pairs of the truncated correlated signals are selected, and a cross-correlation applied to the selected pairs in step 11. In its simplest form with two second sound sources, there is single pair for which the cross correlation in step S11 can be selected. In more complex scenarios with several recorded second sound signals, several pairs can be selected. One can generally assume that larger number of selected pairs provide a more precise determination as possible fluctuations and statistical errors may cancel each other out. The result of step 11 is therefore one or more cross correlated signals. Those signals are up-sampled in step S12 to provide a finer timing resolution affecting the accuracy of the angle determination.

The cross-correlated signals in step S11 and S12, respectively comprise ono or more maxima usually only one of relevance due to the previous truncation). The location of this maximum of the cross correlation (or PHAT for SRP-PHAT) of a pair of truncated correlated signals corresponds to the time difference of arrival between the microphone elements recording the plurality of second sound signals.

The time difference of arrival can be mapped to the angle of incidence making use of the knowledge about the location of the microphones recording the second sound signal. This means that the cross correlation can be projected in the spherical spatial space instead of the time domain. This is carried out for all cross correlation estimates for all pairs of seconds. The projected estimates are then simply summed together and a search for the maximum is carried out. The location of the maximum corresponds to the angle of arrival.

One additional aspect concerns the processing of sound signals which move over time. For example, if more than one first microphone is present, one may use an active speaker detection algorithm for identifying the current active speaker and the first microphone associated with it. For moving sound signals, one can estimate the location of the und source at different times making use of a dynamic model and Kalman filtering. The Kalman filter keeps track of the estimated state of the system and the variance or uncertainty of the estimate. The estimate is updated using a state transition model and measurements.

The invention claimed is:

1. A method for obtaining a position of a sound source relative to a dedicated reference point, comprising the steps of:

obtaining a first sound signal recorded at a sound source;

obtaining a plurality of second sound signals each recorded at a position in a known relation to the dedicated reference point;

wherein the first sound signal and the plurality of second sound signals are synchronized in time;

for the first sound signal:

estimating a filter acting on the signal-to-noise ratio in each frequency bin of the first sound signal in a time-frequency domain;

correlating the first sound signal with at least one of the plurality of second sound signals in the frequency domain to obtain at least one correlated signal;

applying said filter to the at least one correlated signal to obtain at least one filtered and correlated signal;

obtaining a first timing value in the at least one filtered and correlated signal exceeding a dedicated threshold in the time domain; and obtaining a second timing value corresponding to a threshold value in the at least one filtered and correlated signals based on the first timing value; and estimating the distance between the dedicated reference point and the sound source based on the respective obtained first timing value and second timing value.

2. The method of claim 1, further comprising:

for at least two filtered and correlated signals of the recorded at a position in known relation to the dedicated reference point:

truncating the at least two filtered and correlated sound signals around a specific time period;

obtaining a cross correlation between pairs of truncated filtered and correlated sound signals; and obtaining the angle of arrival of the filtered first sound signal by projecting the obtained cross correlation in a spherical spatial space.

3. A method for obtaining an angle of a sound source relative to a dedicated reference point, comprising the steps of:

obtaining a first sound signal recorded at one or more sound sources;

obtaining a plurality of second sound signals each recorded at a position in a known relation to the dedicated reference point;

wherein the first sound signal and the plurality of second sound signals are synchronized in time;

for the first sound signal:

estimating a filter acting on the signal-to-noise ratio in each frequency bin of one of the first sound signal in a time-frequency domain;

correlating the first sound signal with at least two of the plurality of second sound signals in the frequency domain to obtain at least two correlated signals;

applying said filter to the correlated signal to obtain at least two filtered and correlated signals;

truncating the at least two filtered and correlated sound signals around a specific time period selected such to cut-off reflection from the environment by at least the first sound signal; and obtaining a cross correlation between pairs of truncated filtered and correlated sound signals of the plurality of second sound signals; and obtaining the angle of arrival of the filtered first sound signal by projecting the obtained cross correlation in a spherical spatial space.

4. The method according to claim 3, wherein the specific time period is proportional to a maximum time of flight between the positions of the plurality of second sound signals.

5. The method according to claim 3, wherein the step of truncating the filtered and correlated sound signal comprises the step of:

up-sampling the plurality of filtered and correlated sound signals; or up-sampling the truncated filtered and correlated sound signals.

6. The method according to claim 3, wherein the step of obtaining a cross correlation comprises:

applying a steered response to each of the truncated filtered and correlated sound signals.

7. The method according to claim 1, wherein correlating the first sound signal comprises:

up-sampling the first sound signal and the plurality of second sound signals; or up-sampling the at least two correlated signals.

8. The method according to claim 3, wherein the step of estimating a filter for the first sound signal comprises estimating a spectrum mask.

9. The method according to claim 8, wherein the step of estimating a spectrum mask filter comprises:

determine signal to noise ratio, SNR based on the noise for each time slice (k) in response on a previous time slice;

set the spectrum mask parameter for a given frequency to 0 if the signal to noise ratio does not exceed a pre-determined threshold; and set the spectrum mask parameter for the given frequency to 1 if the signal to noise ratio exceeds the pre-determined threshold.

10. The method according to claim 3, wherein the step of correlating the first sound signals with at least one of the plurality of second sound signals and applying said filter to the correlated signals comprises the step of:

performing a short-time Fourier transformation, STFT, on the first sound signal and on the at least one of the plurality of second sound signals to obtain a respective spectrogram;

obtaining a cross spectrum on the respective spectrograms;

applying said filter to the obtained cross spectrum; and perform a reversed short-time Fourier transformation, ISTFT, to obtain the filtered first sound signal.

11. The method according to claim 3, wherein estimating a filter acting on the signal-to-noise ratio in each frequency bin of the first sound signal comprises the steps of:

applying a quantile filter, particularly a median filter for smoothing a power spectrum for each time slice (k) of a power spectrum derived from the one or more first recorded sound signals;

estimating the noise for each time slice (k) in response on a previous time slice; and evaluate for a given frequency whether the signal to noise ratio exceeds a pre-determined threshold and set the filter parameter for said frequency to 1 or 0 in response thereto.

12. The method according to claim 3, wherein estimating a filter acting on the signal-to-noise ratio in each frequency bin of the first sound signal comprises the steps of applying the residual signal from a denoising process as the noise estimate, wherein the denoising process can be optionally based on machine learning.

13. The method according to claim 3, further comprising for of at least two first sound signals:

estimating a filter acting on the signal-to-noise ratio in each frequency bin of one of the two first sound signals in a time-frequency domain;

correlating the first of the two first sound signals with the second of the two first sound signals in the frequency domain and applying the estimated filter to the correlated signals;

evaluating a time difference between the correlated signals; and selecting one of the two first sound signals based on the evaluation of the time difference as the one or more first sound signal.

14. The method of claim 13, wherein the step of correlating comprises the steps of:

performing a short-time Fourier transformation, STFT of the two first sound signals to obtain a respective spectrogram;

obtaining a cross spectrum on the respective spectrograms applying said filter to the obtained cross spectrum; and perform a reversed short-time Fourier transformation, ISTFT, to obtain the filtered and correlated first sound signal.

15. The method according to claim 3, wherein the plurality of second sound signals comprises four audio sound signals, wherein two of those four sound signals are recorded with a maximum spatial distance of 15 cm.

16. The method according to claim 3, further comprising:

obtaining air temperature information, in particular air temperature information in the vicinity of the plurality of second sound sources; and estimating the distance in response to the obtained air temperature information.

17. The method according to claim 3, further comprising:

feeding the estimated distance between the dedicated reference point and the one or more sound sources to a Kalman filter or a particle filter.

18. A computer system comprising:

one or more processors;

a memory coupled to the one or more processors and comprising instructions, which when executed by the one or more processors cause the one or more processors to perform the steps of:

obtaining a first sound signal recorded at one or more sound sources;

obtaining a plurality of second sound signals each recorded at a position in a known relation to a dedicated reference point;

wherein the first sound signal and the plurality of second sound signals are synchronized in time;

for the first sound signal:

estimating a filter acting on the signal-to-noise ratio in each frequency bin of one of the first sound signal in a time-frequency domain;

correlating the first sound signal with at least two of the plurality of second sound signals in the frequency domain to obtain at least two correlated signals;

applying said filter to the correlated signal to obtain at least two filtered and correlated signals;

truncating the at least two filtered and correlated sound signals around a specific time period selected such to cut-off reflection from the environment by at least the first sound signal; and obtaining a cross correlation between pairs of truncated filtered and correlated sound signals of the plurality of second sound signals; and obtaining the angle of arrival of the filtered first sound signal by projecting the obtained cross correlation in a spherical spatial space.

19. The method according to claim 1, wherein the step of truncating the filtered and correlated sound signal comprises the step of:

up-sampling the plurality of filtered and correlated sound signals; or up-sampling the truncated filtered and correlated sound signals.

20. The method according to claim 1, wherein the step of obtaining a cross correlation comprises:

applying a steered response to each of the truncated filtered and correlated sound signals.

* * * * *